United States Patent
Weitz et al.

(10) Patent No.: US 7,752,890 B2
(45) Date of Patent: Jul. 13, 2010

(54) METHOD AND APPARATUS FOR CONTINUOUS FLUID LEAK MONITORING AND DETECTION IN ANALYTICAL INSTRUMENTS AND INSTRUMENT SYSTEMS

(75) Inventors: Karl K. Weitz, Pasco, WA (US); Ronald J. Moore, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 379 days.

(21) Appl. No.: 11/936,989

(22) Filed: Nov. 8, 2007

(65) Prior Publication Data

US 2009/0120166 A1    May 14, 2009

(51) Int. Cl.
*G01M 3/08* (2006.01)
(52) U.S. Cl. ..................... 73/40.5 R; 73/40
(58) Field of Classification Search ........... 73/40–40.7, 73/46, 40.5 R
See application file for complete search history.

(56) References Cited

U.S. PATENT DOCUMENTS

| | | | | |
|---|---|---|---|---|
| 2,947,166 A | * | 8/1960 | Palmer et al. ................. | 73/40.7 |
| 3,771,349 A | * | 11/1973 | Yatabe ....................... | 73/29.05 |
| 4,206,632 A | * | 6/1980 | Suzuki ..................... | 73/40.5 R |
| 5,101,657 A | | 4/1992 | Lahlouh et al. | |
| 5,190,069 A | | 3/1993 | Richards | |
| 6,526,807 B1 | * | 3/2003 | Doumit et al. ........... | 73/40.5 R |

OTHER PUBLICATIONS

1050 Series of HPLC Modules. "Service Handbook—Variable Wavelength Detector (79853C)." Agilent Technologies. Nov. 2001. pp. 1-8, 570, 598, 599, 611, 613, 617, 634, 655, 657, 663, 664, and 683-687.*
Bloom, Tom. "Leak Checking a GC System." Accessed online at <www.restek.com> on Jan. 12, 2010. Online publication date is Oct. 17, 2006.*

* cited by examiner

*Primary Examiner*—Lisa M Caputo
*Assistant Examiner*—Punam Roy
(74) *Attorney, Agent, or Firm*—James D. Matheson (57) ABSTRACT

A method and device are disclosed that provide for detection of fluid leaks in analytical instruments and instrument systems. The leak detection device includes a collection tube, a fluid absorbing material, and a circuit that electrically couples to an indicator device. When assembled, the leak detection device detects and monitors for fluid leaks, providing a preselected response in conjunction with the indicator device when contacted by a fluid.

6 Claims, 7 Drawing Sheets

METHOD AND APPARATUS FOR CONTINUOUS FLUID LEAK MONITORING AND DETECTION IN ANALYTICAL INSTRUMENTS AND INSTRUMENT SYSTEMS

This invention was made with Government support under Contract DE-AC05-76RLO1830 awarded by the U.S. Department of Energy. The Government has certain rights in the invention.

FIELD OF THE INVENTION

The present invention relates generally to leak detection instrumentation and more particularly to a leak detection device and process for monitoring and detection of fluid leaks at a leak detection location within a fluid flow path of analytical instruments and instrument systems.

BACKGROUND OF THE INVENTION

Quality control and detection limit sensitivities in small instrument systems are subject to full flow volumes and accurate assessment of analytes in fluid samples. Accurate sensitivity values depend on accurate and consistent fluid volumes. As such, any variation in fluid volume has a large effect on sensitivities reported for various sample analyses. Leaks in valves and valve systems of bench-scale analytical instruments can occur when, e.g., valve seals fail, or when incorrect fluid volumes are delivered within analytical process flows. Early detection of such leaks can limit quality control consequences and incorrect reporting of analytical results stemming from failed valves and valve systems in these instruments. Accordingly, new leak detection systems, devices, and methods are needed that permit early detection of fluid leaks in analytical instruments that reduce the quantity of failed samples.

SUMMARY OF THE INVENTION

The invention is a device that detects a fluid leak within a flow path at a leak detection location within an analytical instrument or instrument system. The device includes: a collection tube that collects the fluid from the fluid leak in the flow path within the analytical instrument or the instrument system. The collection tube includes a first lead and a second lead that are in electrical communication with an indicator device. When a fluid from a fluid leak is released within the flow path of the analytical instrument or instrument system, the fluid is absorbed into the collection tube and contacts the leads; whereby the indicator device provides a preselected response.

The invention is further a method for detecting a fluid leak at a leak detection location within a flow path of an analytical instrument or instrument system. The method includes the steps of: placing a collection tube at the leak detection location within the flow path of the analytical instrument or the instrument system, the collection tube including a first lead and a second lead; and connecting the first lead and the second lead to an indicator device such that when the fluid from the fluid leak is present at the leak detection location, the fluid is absorbed into the collection tube where it contacts the leads; and whereby the indicator device provides a preselected response.

BRIEF DESCRIPTION OF THE DRAWINGS

FIG. 5b is an intact view of the collection tube of FIG. 5a.

DETAILED DESCRIPTION OF THE PREFERRED EMBODIMENTS OF THE INVENTION

Following is a description of preferred and best modes for embodiments of the present invention. Figures presented hereinafter describe a preferred embodiment of the present invention, which is configured for detection of fluid leaks in analytical instruments and instrument systems. It will be clear from the description that the invention is not limited to the illustrated embodiments but may also include a variety of modifications, alternative constructions, and further embodiments. For example, the invention may be variously embodied for use in other like instrument fluid leak detection applications and fluid leak detection systems, and may also include additional components or devices for obtaining a desired and designated result. Thus, it should be understood that there is no intention to limit the invention to the specific forms disclosed and the description should be seen as illustrative and not limiting. The invention encompasses all modifications, alternative constructions, and equivalents falling within the spirit and scope of the invention as defined by the claims.

Analytical Instruments and Instrument Systems

The leak detection device (sensor) of the present invention detects fluids at a leak detection location within an analytical instrument or an instrument system. Analytical instruments and instrument systems include, but are not limited to, e.g., liquid chromatography (LC) instruments and instrument systems; capillary electrophoresis instruments and instrument systems; ion chromatography instruments and instrument systems; ICP/MS instruments and instrument systems, including components thereof (e.g., valves, autosamplers, pumps, etc.). LC instrument and instrument systems include, but are not limited to, e.g., high performance liquid chromatography (HPLC) instruments and instrument systems; normal-phase LC instruments and instrument systems; reversed-phase LC instruments and instrument systems; cation and anion exchange LC instruments and instrument systems; liquid adsorption chromatography instruments and instrument systems; supercritical fluid chromatography (SFC) instruments and supercritical fluid chromatography and supercritical fluid extraction (SCFE) instruments and instrument systems; liquid-liquid chromatography instruments and instrument systems; liquid exclusion chromatography instruments and instrument systems; gas-liquid chromatography instruments and instrument systems; size exclusion chromatography instruments and instrument systems; gel permeation chromatography instruments and instrument systems; filtration chromatography instruments and instrument systems; and components thereof. Capillary electrophoresis instruments and instrument systems include, but are not limited to, e.g., over-the-gel electrophoresis instruments and instrument systems; capillary isoelectric focusing instruments and instrument systems; isotachophoresis instruments and instrument systems; gel separations in one or more dimensions instruments and instrument systems; and combinations thereof.

Figure 1:
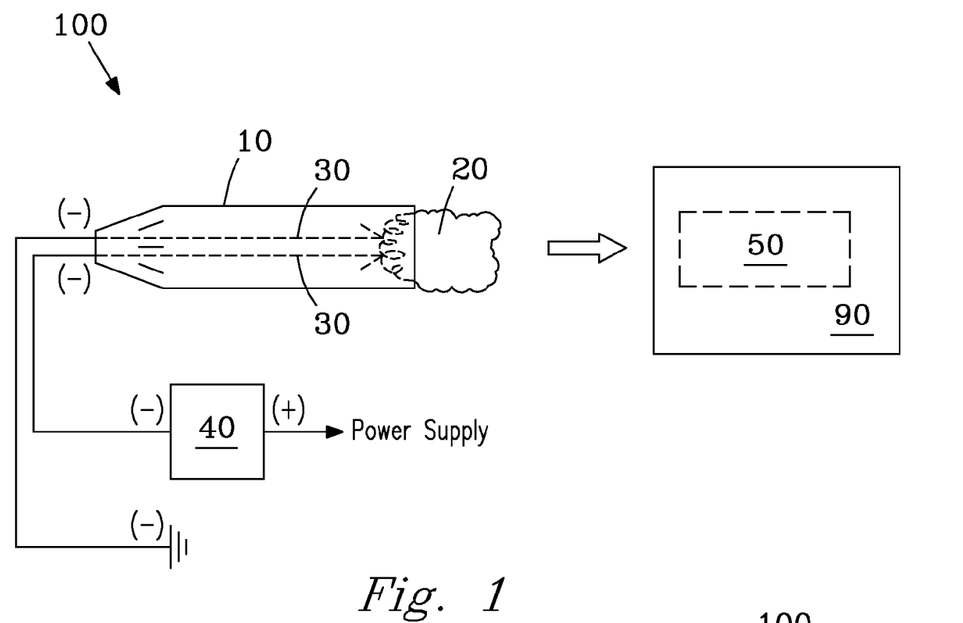
FIG. 1 is a perspective view of a preferred embodiment of the leak detection device.

FIG. 1 illustrates a preferred embodiment of a leak detection device 100 of the present invention for detecting fluid leaks at a leak detection location 50 within an analytical instrument 90 or analytical instrument system. The leak detection device includes a collection tube 10 of a preselected length that is in fluid communication with a fluid absorbing material 20. The fluid absorbing material is pre-positioned in a fluid receiving end of the collection tube so as to be in contact with detection leads 30 (e.g., wires). Detection leads 30 electrically couple to an indicator device 40 (e.g., an LED). In the preferred embodiment, detection leads 30 are negative (−) leads to minimize potential for heating of leak fluids or solvents received into collection tube 10, electrical shorts, and/or shock hazards to instrument operators. In operation, leak detection device 100 is positioned at a leak detection location 50, with the fluid absorbing material 20 end of the device located near the detection point of interest. Fluid released at a leak detection location within the analytical instrument or instrument system is received by the fluid absorbing material into the collection tube of the leak detection device. The fluid contacts detection leads 30 and completes the detection circuit, allowing current to flow to indicator device 40 (e.g., an LED or other indicator device), thereby providing for detection and monitoring of fluid leaks within the analytical instrument 90 or instrument system. The indicator device provides a preselected indicator response, e.g., energizing of a colored indicator light, and/or providing a message, communication, or other warning that permits a prescribed action to be taken by the operator. Alternatively, the indicator device can undertake a preselected action in response to the flow of current to the indicator device, e.g., instrument shut-down. Other instrument and electrical configurations may be selected as will occur to those of skill in the art, e.g., as described further herein in reference to FIGS. 7 and 8.

Fluid Absorbing Materials

Fluid absorbing materials suitable for use with the leak detection device (sensor) include, but are not limited to, e.g., fluid absorbing fibers, felts, cloth, paper, sponges, polymers, and like materials. Fluid absorbing fibers include, e.g., cellulose derived fibers such as those known by the tradenames RAYON®, NOMEX®, and KEVLAR® (DuPont, Wilmington, Del., USA). Fluid absorbing polymers include, e.g., polyesters, polypropylenes, nylons, other fluid absorbing polymers, and combinations thereof. Preferred fluid absorbing materials can be appropriately sized or sectioned for insertion into various leak detection locations (e.g., small diameter leak detection locations), and appropriately manipulated or configured to permit exchange or replacement following a leak detection event. In the preferred embodiment of the leak detection device (sensor), the fluid absorbing material is a cellulose based fiber, e.g., RAYON® fiber or viscose RAYON® fiber (DuPont, Wilmington, Del., USA) that is capable of absorbing between 5 times and 25 times its weight in fluids or solvents, or alternatively is capable of absorbing fluids or solvents at a rate that exceeds the rate of evaporation of the fluids or solvents, thereby retaining the fluids or solvents for a time sufficient to permit detection by the leak detection device (sensor). The fluid absorbing material of the leak detection device can be placed or configured within a suitable carrier or cartridge that permits it to be rapidly exchanged or replaced following a leak detection event, preparing the device for a subsequent leak detection event. The fluid absorbing material may further include at least one fluid absorbing compound to promote fluid retention, including, e.g., fluoropolymers; and perfluoroalkoxy polymer resins (PFAs), e.g., in a monolithic liquid chromatography (LC) packing material, including, but not limited to, e.g., ultra-violet light activated $C_{18}$ polymer packing materials. The fluid absorbing material may also be charged with at least one charge bearing or ion releasing compound that promotes the transmission or flow of electrical charge and current in the fluids detected by the leak detection device (sensor). The charge bearing or ion releasing compounds can be introduced to the fluid absorbing material by, e.g., saturating the untreated fluid absorbing material in a solvent or fluid containing the charge-bearing or ion-releasing compound, drying same, and sizing (e.g., cutting or sectioning) the fluid absorbing material for use in the detection device described herein. In operation, when contacted by a leak fluid, the fluid absorbing material releases the charge bearing or ion releasing compound to the detection leads in contact with the fluid absorbing material, which provides measurable current or charge to the indicator device, thereby indicating detection of a fluid leak at the leak detection location within the analytical instrument or instrument system. Charge-bearing or ion-releasing compounds include ionic salts; extraction salts [e.g., NaCl, LiCl, $Na_2SO_4$, $Li_2SO_4$, $(NH_4)_2SO_4$]; protic acids (e.g., trifluoroacetic acid, formic acid, acetic acid, nitric acid); and protic acid salts. Charge-bearing or ion-bearing compounds can also be mixed to achieve desired charge or current flow requirements in the leak detection device (sensor) for detection of various fluids and solvents employed in analytical instruments and instrument systems. Choice of charge-bearing or ion-releasing compounds depends on the solubility of such compounds within the various polar and non-polar fluids or solvents employed within the analytical instruments and instrument systems, including, e.g., mixed fluids and solvents. No limitations are intended by the disclosure of specific salts and compounds described herein.

Solvents and Fluids

Solvents and fluids detected in conjunction with the fluid detection device (sensor) of the invention are not limited. Solvents and fluids include, e.g., aqueous fluids, organic fluids, and combinations thereof as will be employed in various analytical instruments and instrument systems known in the art, e.g., LC and HPLC instruments and instrument systems. For example, in exemplary LC systems (e.g., HPLC instruments and instrument systems), solvents can be of a completely aqueous composition, of a completely organic composition, or of a mixed composition that comprises various mixtures of aqueous and organic solvents or fluids, e.g., a 90:10 aqueous:organic solvent mixture, but is not limited thereto. In an exemplary HPLC solvent system, various mixtures of water and acetonitrile are used, that may further include, e.g., 1% trifluoroacetic acid (TFA). All solvents and fluids systems as will be contemplated or used by those of skill in the art are within the scope of the invention. Thus, no limitations are intended.

Figure 2:
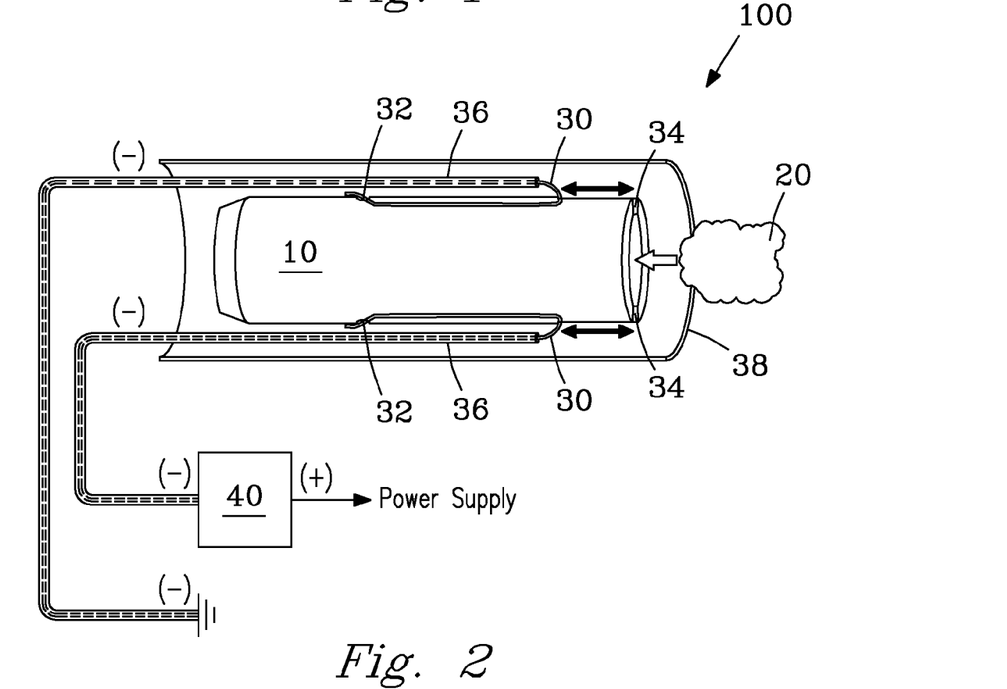
FIG. 2 shows exemplary components of the leak detection device of FIG. 1.

FIG. 2 presents a view showing components of the preferred embodiment of leak detection device 100 of FIG. 1. In the figure, fluid absorbing material 20 of leak detection device 100 inserts into a fluid-receiving end of collection tube 10 so as to be positioned between, or in contact with, exposed portions of two respective detection leads 30 (e.g., wires). Leads 30 are introduced through entry holes 32 on respective sides of collection tube 10. Entry holes are positioned to provide a sufficient length of exposed wire along the interior wall of the collection tube to be in contact with fluid absorbing material 20. Length of the leads within the collection tube is adjusted in conjunction with two (vertical) slits 34 introduced into respective sides at the top of the collection tube. In the instant embodiment, detection leads 30 pass from the interior of the collection tube out through the (vertical) slits into insulated sheaths 36 that run along the exterior surface of respective sides of the collection tube and couple either to indicator device 40, where current or charge is received, or to electrical ground. In the figure, assembled components of device 100 are secured in place within a suitable covering or encasement material 38, e.g., heat shrinkable tubing or wrapping, plastics (e.g., thermal plastics), tubes, and like materials as will be known to those of skill in the art. No limitations are intended. In operation, when a fluid released at a leak detection location contacts fluid absorbing material 20 of leak detection device 100, the fluid is absorbed and drawn into collection tube 10, making contact with the exposed detection leads 30, which contact completes a detection circuit allowing current to flow to indicator device 40, which then provides a preselected indicator response notifying a user or operator that a fluid leak has been detected within analytical instrument 90 or instrument systems (e.g., valve systems), including components thereof (e.g., an instrument valve).

Figure 3A:
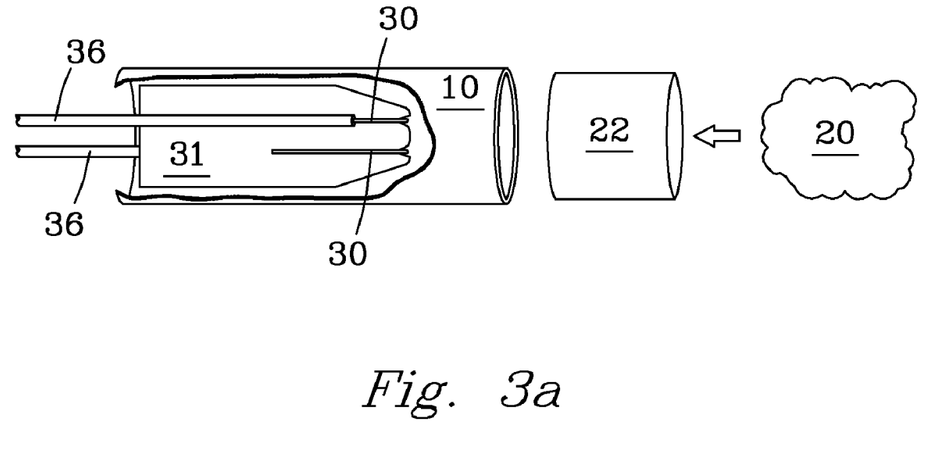
FIG. 3a shows a two-stage design of the leak detection device that includes a cartridge for holding a fluid absorbing material and a mounting card for mounting the detection leads, according to an embodiment of the invention.
Figure 3B:
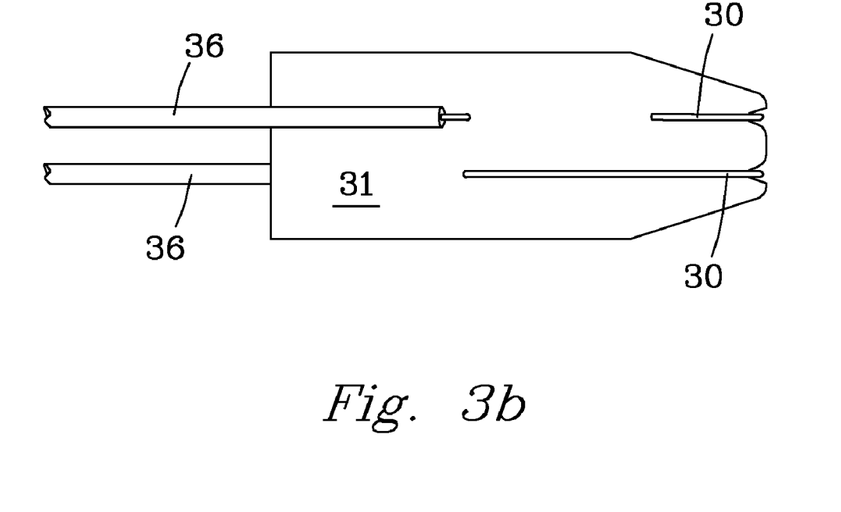
FIG. 3b shows a mounting card of a different design for the two-stage design of FIG. 3a, according to another embodiment of the invention.

FIG. 3a shows an exemplary two-stage design for leak detection device 100 (sensor), according to another embodiment of the invention. In the instant embodiment, leak detection device 100 includes a cartridge 22 that holds the fluid absorbing material 20. Cartridge 22 is of a slightly smaller diameter than the collection tube which permits it to be inserted into the fluid receiving end of the collection tube 10, but is not limited. Cartridge 22 is constructed of materials including, but not limited to, e.g., plastics including, e.g., polyethylene (PE) and high density polyethylene (HDPE); polyvinylchloride (PVC); polypropylene (PP); fluoropolymers; polytetrafluoroethylene (PTFE) also known as TEFLON® (DuPont™, Wilmington, Del., USA); acrylics; polycarbonates; cellulose derived materials including, e.g., fiber board materials; and other rigid cellulose based materials. Fluid absorbing material 20 is introduced to cartridge 22 and then inserted into the fluid receiving end of the collection tube so as to be in contact with leads 30. Cartridge 22 permits rapid exchange of the fluid absorbing material following a leak detection event. In the instant embodiment, detection leads 30 mount on a platform or mounting card 31 that inserts into the collection tube from an end opposite that which receives the cartridge containing the fluid absorbing material. Card 31 is constructed of a non-conducting material that is sufficiently rigid that it can be inserted into the collection tube and can maintain the mounting configuration of the detection leads. Card materials include, but are not limited to, e.g., plastics, polyethylene, polystyrene, polytetrafluoroethylene (PTFE) also known as TEFLON® (DuPont™, Wilmington, Del., USA), cellulose-based materials, porous cellulose-based materials, other porous materials, fiber board materials, wood products, and like materials. In the instant configuration, a first lead anchors to the top of the card terminating on the rear face; a second lead anchors at the top of the card terminating on the front face, but configuration is not limited thereto. When inserted into the collection tube, detection leads 30, mounted on card 31, exit from the rear of the collection tube in insulated sheaths 36 and couple to an indicator device (not shown) as described previously herein. FIG. 3b shows a modification to the mounting configuration of the detection leads 30 on the mounting card 31 of FIG. 3a. In the figure, a first lead passes through the front face of the card and anchors at the top of the card, terminating on the front face; a second lead anchors at the top of the card also terminating on the front face, but configuration is not limited. When inserted into the collection tube, detection leads 30 mounted on card 31 exit from the rear of the collection tube in insulated sheaths 36 and again couple to an indicator device (not shown), described previously herein.

Figure 4A:
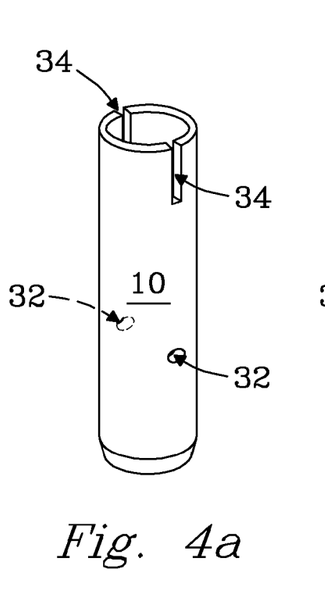
FIGS. 4a-4c show three different embodiments of the collection tube useable in conjunction with the preferred embodiment of the leak detection device.
Figure 4B:
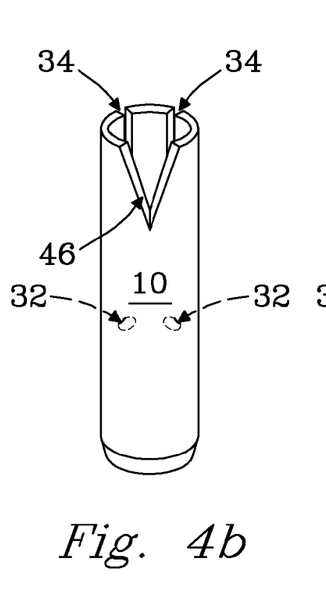
Figure 4C:
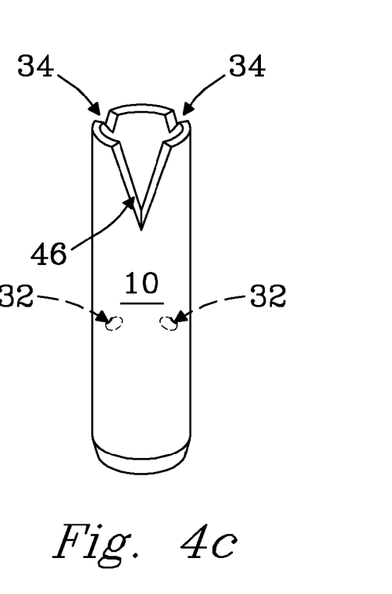

FIGS. 4a-4c present perspective views of collection tube 10 of the leak detection device previously described hereinabove, according to different embodiments thereof. FIG. 4a presents a preferred embodiment of the collection tube 10. In the figure, two (vertical) slits 34 (described in reference to the FIG. 2) are introduced at the top of the collection tube down through a selected distance on respective sides of the tube, which permit positioning of the lead wires (not shown) so as to be in contact with the fluid absorbing material (not shown). Entry holes 32 are introduced through, and on respective sides of, the collection tube, vertically in line with the slits introduced at the top of the collection tube, to accept detector lead wires 30. In the preferred embodiment, the collection tube has a preferred length of about ¾ inches (1.91 cm). Slits of the instant embodiment have a length down the tube of about 1/16 inches (0.159 cm), but is not limited thereto. Entry holes are introduced into the collection tube about ½ inches (1.27 cm) down from the top of the collection tube, but is not limited thereto. All dimensions that permit proper assembly and operation of the leak detection device (sensor) may be used. Thus, no limitations are intended by the listed dimensions. FIGS. 4b-4c present two modifications to collection tube 10 that facilitate positioning of the leak detection device (sensor) at a leak detection location within an analytical instrument or instrument system. In FIG. 4b, a V-shaped notch 46 is introduced at the top of collection tube 10 that permits sizing of the collection tube in the assembled leak detection device, e.g., for insertion into a desired leak detection location. Two (vertical) slits 34 (previously described in reference to FIG. 2) are introduced at the top of the collection tube and down a selected distance on respective sides, which permit positioning of the lead wires (not shown). Two entry holes 32 are introduced into the collection tube vertically in line with the slits to accept the lead wires that are introduced into the collection tube. In FIG. 4c, collection tube 10 includes the V-shaped notch 46, described previously in reference to FIG. 4b. In the instant embodiment, (vertical) slits 34 are replaced with small V-shaped notches 34. Entry holes 32 are introduced into the collection tube vertically in line with the small V-shaped notches 34 which permit lead wires to be introduced into the collection tube. No limitations are intended. All modifications as will be implemented by those of skill in the art in view of the disclosure are encompassed hereby. The collection tube is preferably composed or constructed of a material sufficiently rigid as to permit positioning of the leak sensor at, or within, a leak detection location within an analytical instrument or instrument system. The collection tube material is also preferably compatible with selected solvents and fluids used in conjunction with the analytical instrument or instrument system. Collection tube materials include, but are not limited to, e.g., plastics including, e.g., polyethylene (PE) and high density polyethylene (HDPE); polyvinylchloride (PVC); polypropylene (PP); fluoropolymers; polytetrafluoroethylene (PTFE) also known as TEFLON® (DuPont™, Wilmington, Del., USA); acrylics; polycarbonates; and like solvent compatible materials. Collection tube materials further include cellulose based materials, porous cellulose based materials, fiber board materials; fiber based absorbent materials; and solid porous materials, or like materials. No limitations are intended. As will be understood by those of skill in the art, other materials and/or chemical compounds may be added during manufacture to improve properties of the construction materials. These and other fluid and solvent compatible materials may likewise be used as connecting materials when required, e.g., for channeling fluids and solvents to the leak detection sensor, including, e.g., high performance engineered plastic tubing, e.g., TYGON® (Saint-Gobain Performance Plastics, Granville, N.Y., USA). No limitations are intended. As will be appreciated by those of skill in the art, dimensions of the collection tube will depend on the dimensions of the selected leak detection location, e.g., the depth and diameter of a leak port of a fluid switching valve. Thus, dimensions listed herein for the leak detection device (sensor) and components thereof are intended to be exemplary, not exclusive. All dimensions as will be contemplated and selected by those of skill in the art in view of the disclosure are within the scope of the invention.

Figure 5A:
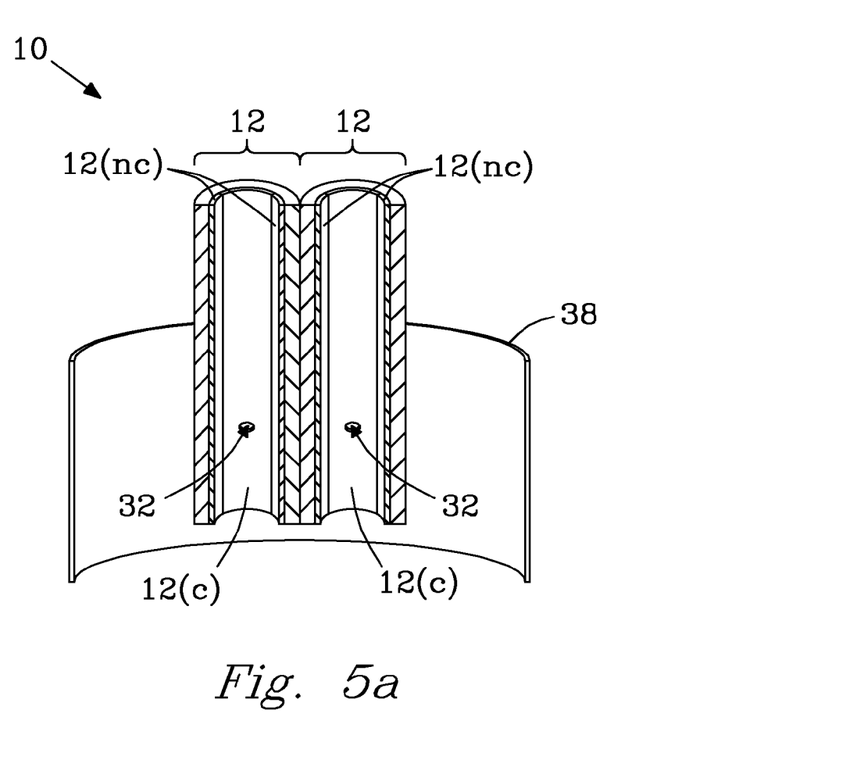
FIG. 5a is a cut away view of another embodiment of the collection tube of the leak detection device.
Figure 5B:
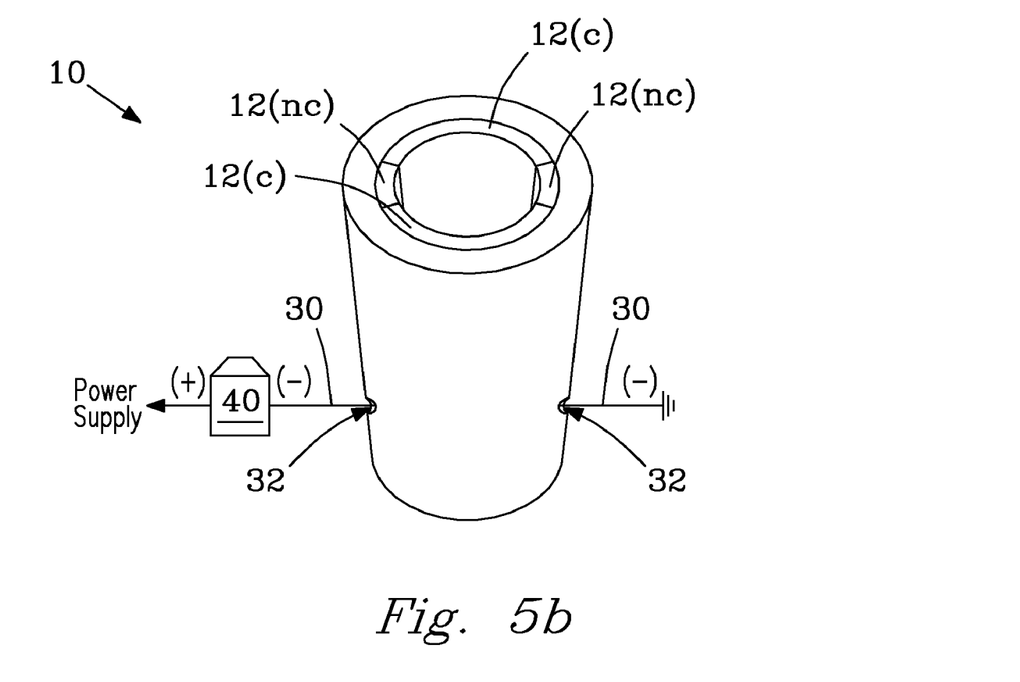

FIG. 5a illustrates another embodiment of collection tube 10. The figure is a cut-away view showing interior surfaces 12 of the collection tube. Collection tube 10 can be constructed from materials described previously herein. In the instant embodiment, a portion of the interior surface 12 is coated with an electrically conducting paint, film, tape, or like conducting material to form a conducting surface 12c. At least a portion of the conducting surfaces contact the fluid absorbing material (not shown) introduced into the fluid receiving end of the collection tube, eliminating need for exposed lead wires described for other embodiments herein. Portions of the interior surface of the collection tube are left uncoated providing non-conducting surfaces 12nc. The non-conducting surfaces 12nc provide electrical separation between the conducting surfaces 12c and the fluid absorbing material. In the figure, two entry holes 32 are shown through which lead wires (not shown) or other electrical components can be introduced to electrically couple an indicator device (described previously herein) with the conducting surfaces 12c. When a leak fluid is introduced into the collection tube, the electrically separated portions of the circuit are bridged, completing a functional circuit which delivers current to the indicator device, which then indicates the presence of a fluid leak. Assembled components are secured in place within a suitable covering or encasement material 38, as described previously herein. FIG. 5b shows the conducting 12c and non-conducting 12nc surfaces in the intact collection tube 10. Entry holes 32 are shown on respective sides of the collection tube through which leads 30 (e.g., wires or other electrical coupling components) can be introduced to electrically couple conducting surfaces 12c with indicator device 40, described previously herein.

Indicator Devices and Indicator Responses

Indicator devices include, but are not limited to, e.g., light-emitting diode (LED) devices; light devices (e.g., strobes, beacons); alarm devices (e.g., horns); display devices (e.g., computer displays, hand-held display devices); communication devices (e.g., phones, pagers, WiFi devices), and like devices. Indicator responses preselected by a user or operator include, but are not limited to, e.g., light responses (e.g., LED responses that include, e.g., a green LED that indicates absence of a fluid leak and a red LED that indicates presence of a fluid leak; strobes, beacons, and other like light responses); alarms and warning responses (e.g., horns); communication responses that include, e.g., text messages, email messages, pager messages, phone messages, and like message responses. All indicator devices and responses as will be contemplated by those of skill in the art in view of the disclosure are within the scope of the invention and encompassed thereby. Thus, no limitations are intended.

Exemplary Leak Detection Systems

Figure 6:
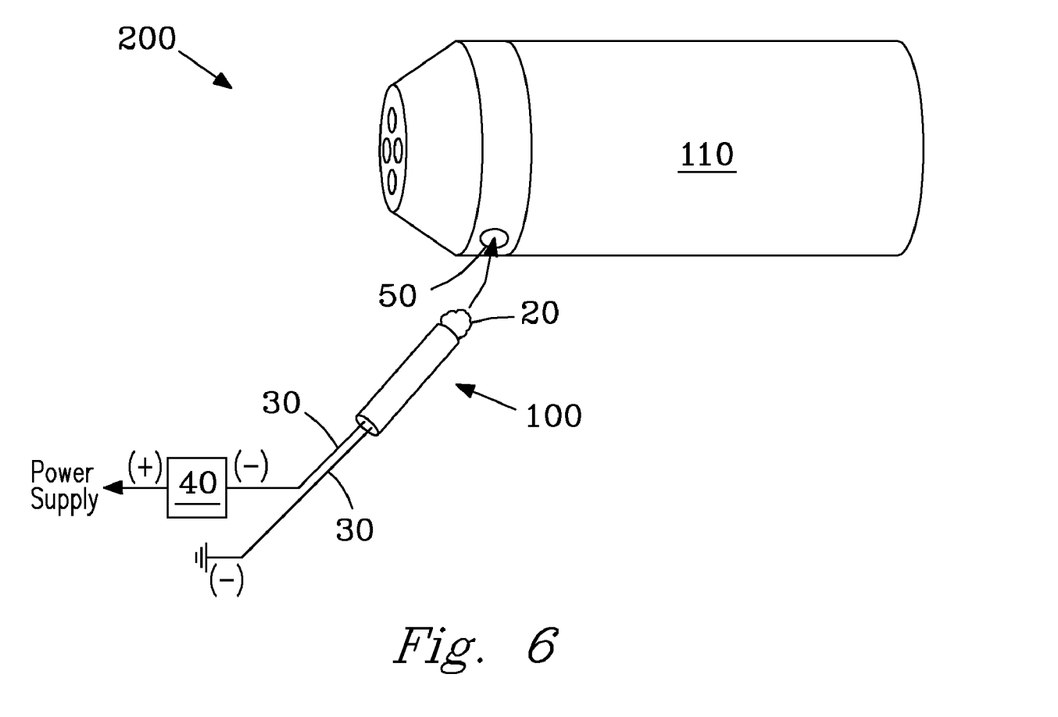
FIG. 6 shows a system configured with the preferred embodiment of the leak detection device for detecting fluid leaks within a valve component of an analytical instrument or instrument system, according to an embodiment of the invention.

FIG. 6 illustrates an exemplary leak detection system 200 of a simple design that incorporates the preferred embodiment of the leak detection device 100 (sensor) for detecting fluid leaks in a component 110 (e.g., a switching valve) of an analytical instrument or instrument system. In the figure, leak detection device 100 is shown at a leak detection location 50, e.g., a leak port 50 of an HPLC switching valve 110 (e.g., a model DC8W, 0.040-mm 8-port, HPLC Valve, VICI Valco Instruments Co., Inc., Houston, Tex., USA), where the leak detection device can monitor for, and detect, fluid leaks. In the instant application, collection tube 10 is a capillary tube having an outer diameter (O.D.) of about ⅛ inches (0.318 cm), and a length of about ¾ inches (1.91 cm). Detection leads 30 extend from an end of collection tube 10 opposite that which contains fluid absorbing material 20 and couple to an indicator device 40, which delivers a preselected indicator response, as described previously herein. Detection leads in the instant application system, are, e.g., 18-gauge to 24-gauge insulated, solid-core copper wires, but are not limited. For example, other electrical coupling materials may be substituted as will be understood by those of skill in the electrical arts, including, but not limited to, e.g., braided wire, electrical ribbons, conducting paints and coatings, and like materials. No limitations are intended.

Figure 7:
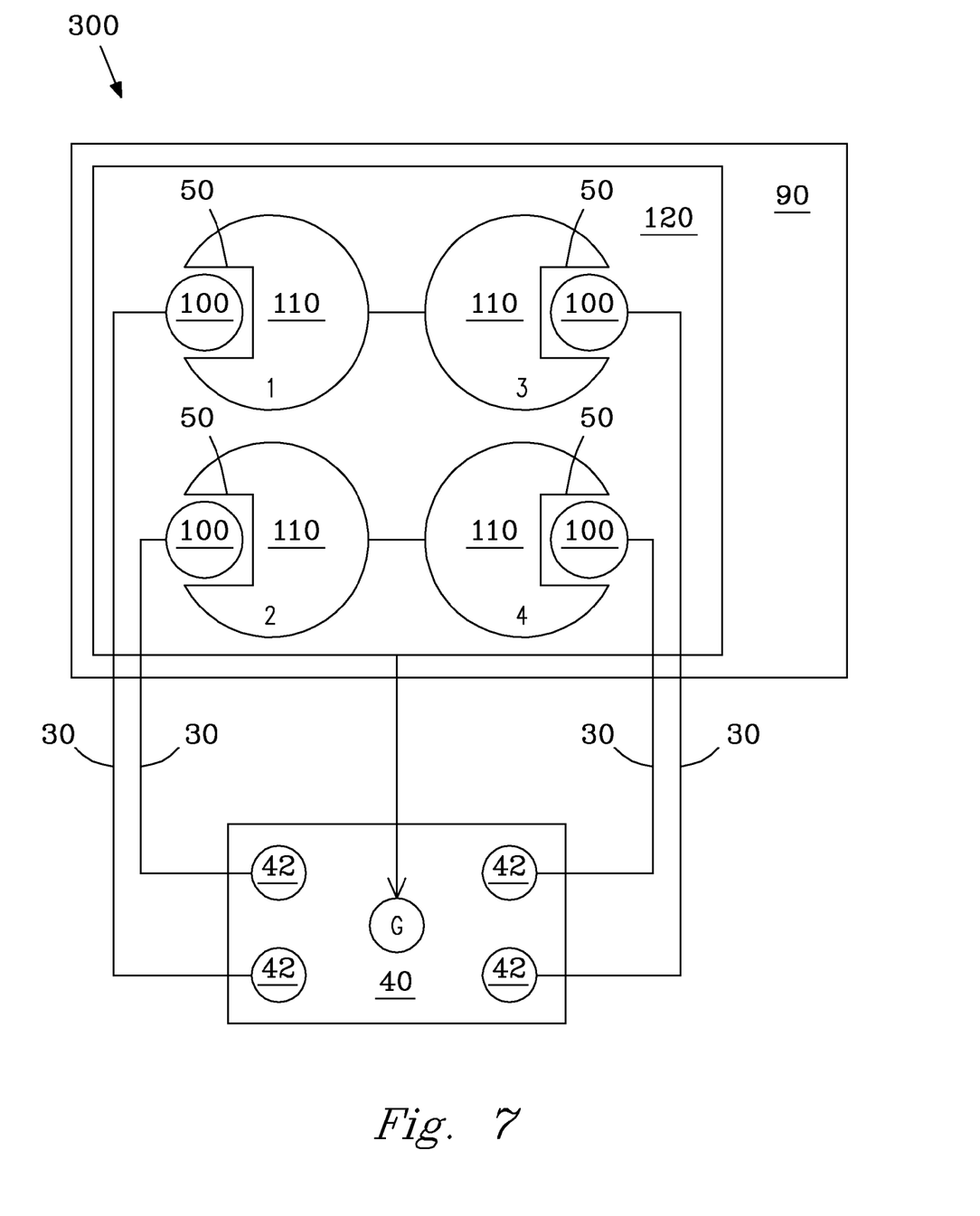
FIG. 7 shows a system configured with the preferred embodiment of the leak detection device for detecting fluid leaks in an analytical instrument and instrument system, according to another embodiment of the invention.

FIG. 7 illustrates another exemplary leak detection system 300 incorporating the preferred embodiment of the leak detection device 100 (sensor) for detecting fluid leaks in an analytical instrument 90, e.g., an HPLC instrument. In the instant application, an HPLC instrument 90 is configured with, e.g., four exemplary HPLC switching valves 110, which are configured into a single valve assembly 120. In the figure, individual leak detection sensors 100 are each positioned at a desired leak detection location 50, e.g., in a leak port 50 of a respective switching valve 110. Each leak detection device 100 is electrically coupled to, e.g., an individual LED 42 by detection leads 30 described previously herein, and each LED is collectively configured into a single indicator device 40, but is not limited. In the instant configuration, each of the LEDs 42 illuminates a first color (e.g., green) when no fluid leak is detected at the desired leak detection location 50 in the coupled detection device 100; the LEDs illuminate a second color (e.g., red) when a leak fluid is detected in any of the valves 110 in the valve assembly 120. An additional LED (G) is electrically coupled to valve assembly 120 and illuminates a selected color (e.g., green) that indicates the leak detection system is in a ready state for monitoring and detecting fluid leaks in valves 110 of valve assembly 120.

Figure 8:
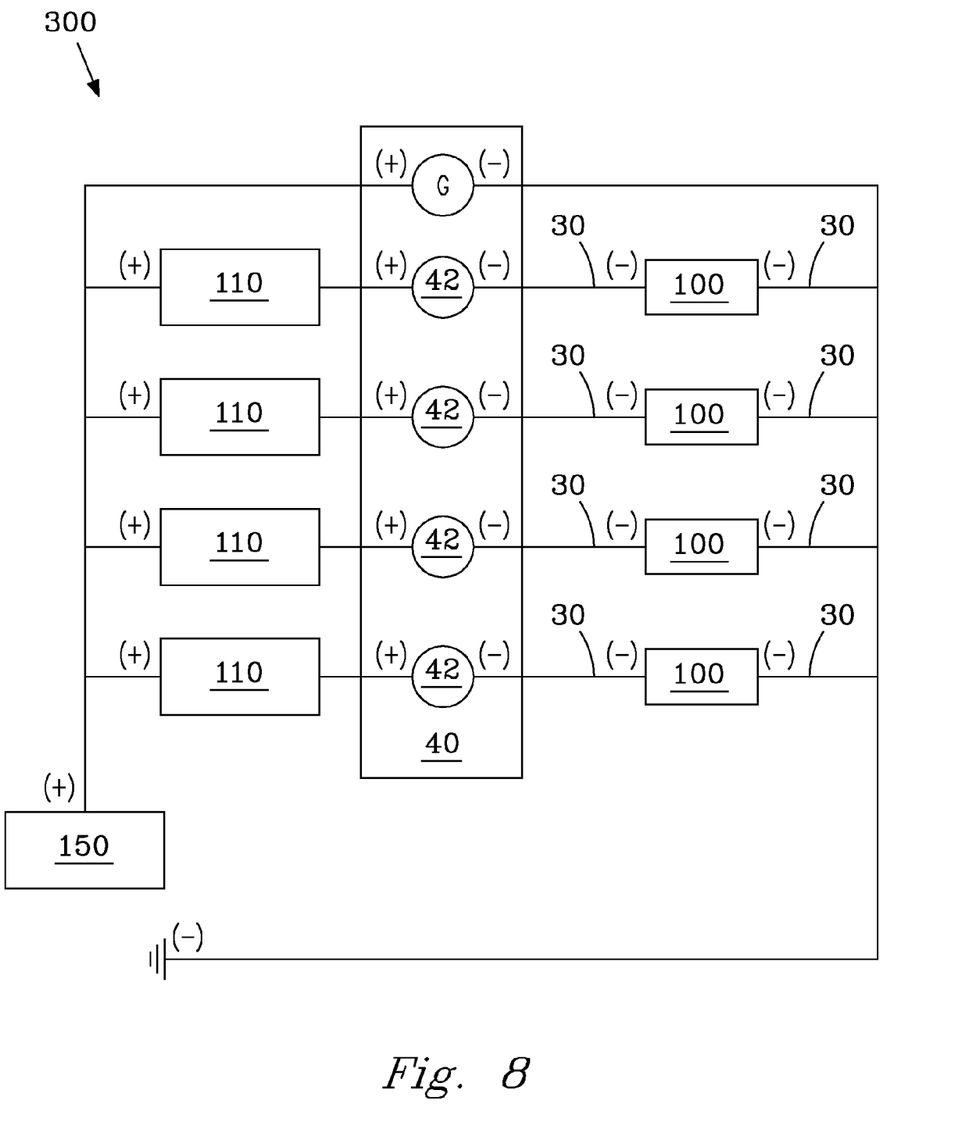
FIG. 8 illustrates a circuit diagram for the leak detection system of FIG. 7.

FIG. 8 illustrates an exemplary circuit diagram for configuring the leak detection system 300 of FIG. 7. In the figure, four leak detection devices 100 (sensors) are electrically coupled to respective instrument switching valves 110 (e.g., HPLC valves) which are further coupled to individual LEDs 42 (i.e., individual indicators) within indicator device 40, as described previously herein. An additional LED (G) is configured within the circuit to indicate a ready state for monitoring and detecting fluid leaks in each of the valves 110. In the figure, detection leads 30 (e.g., wires) from the leak detection devices are preferably negative leads that couple both to an LED 42 and to ground, as described previously herein. Detection system 300 further includes a power source 150 (e.g., a transformer) that delivers a suitable power or voltage to individual components of the detection system. Power requirements are not limited. Power source 150 couples electrically to various components as will be understood by those of skill in the electrical arts. In the instant circuit configuration, power source 150 delivers a preferred voltage of 12 VDC, but is not limited thereto. For example, a ½ multiple of a maximum voltage can be made available to circuit components using step-down voltages from a commercially available power source (e.g., a 300 mA step-down transformer or Universal Power Adapter, Radio Shack, a division of Tandy Corporation, Fort Worth, Tex., USA). Circuit configurations and components are not intended to be limited to the components shown and described herein. All configurations as will be implemented by those of skill in the art in view of the disclosure are within the scope of the invention.

Figure 9:
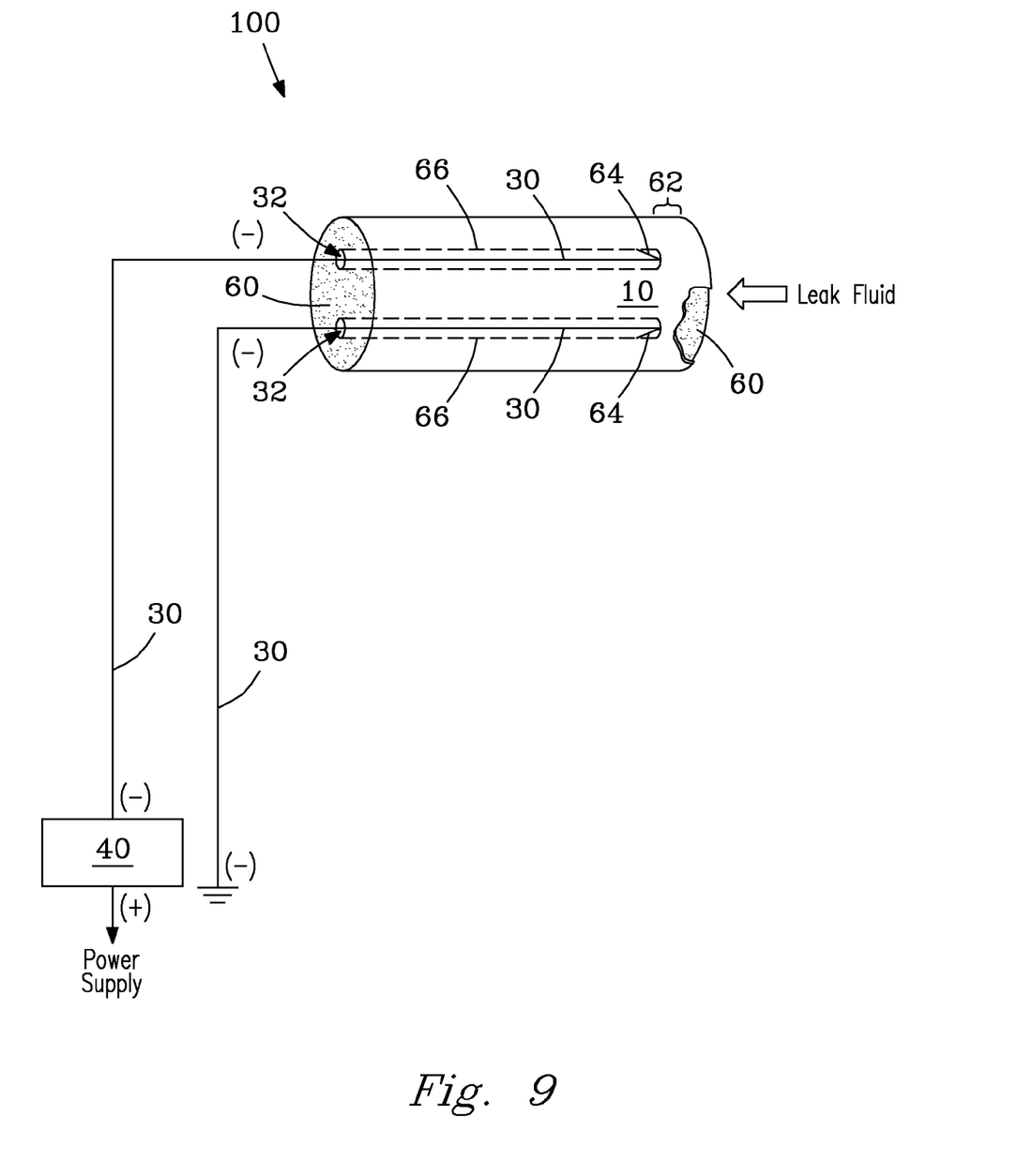
FIG. 9 shows a leak detection device, according to another embodiment of the invention.

FIG. 9 shows still yet another embodiment of the leak detection device 100 (sensor) of the invention for detecting fluid leaks at a leak detection location. In the instant embodiment, collection tube 10 is of a preselected length that is preferably filled with a solidified porous fill material 60 or other porous fill material. The fill material is fluid absorbing, which allows leak fluids introduced at a fluid receiving end of the collection tube to move incrementally through the collection tube. Fill materials 60 are porous materials that include, but are not limited to, e.g., frit materials, cellulose-based materials (e.g., a solidified fill material composed of solidified fine grain sawdust), porous solid core materials, and like porous materials. Detection leads 30 (e.g., wires) are inserted into the fill material 60 at an end of the collection tube preferably opposite that which receives the fluid. The leads are positioned to a preselected depth 62 within the collection tube from the fluid receiving end. The detection leads can be held in place with, e.g., prongs or hooks 64 located at the terminating ends of the detection leads that prevent premature pull-out, but is not limited. Insertion into the fill material can be through entry holes 32 into channels 66 that are, e.g., predrilled to the selected depth. However, methods for preparing, inserting, and positioning the detection leads are not limited. The selected depth of the detection leads can, e.g., establish a predetermined sensitivity to a leak fluid (e.g., a release of 10 μL of fluid) or other preselected detection requirement. Detection leads 30 electrically couple to an indicator device 40 as described previously herein. In operation, leak detection device 100 is positioned at a leak detection location (see, e.g., FIG. 6) near a detection point of interest. Fluid released at a leak detection location is received by the collection tube and contacts detection leads 30 at the preselected depth 62, completing the detection circuit and allowing current to flow to indicator device 40, which then delivers a preselected indicator response or undertakes a preselected action as described herein. In a modification of the instant device (not shown), the collection tube and the porous fill material described above can be replaced with a single solid component comprised of a porous solid, a solidified porous or solid porous cellulose-based material, or other solidified porous material, e.g., a porous frit material (e.g., a model #01018-22707 PTFE frit cartridge, Agilent Technologies, Santa Clara, Calif., USA), with the detection leads introduced as described herein. No limitations are intended.

While simple LED indicator devices have been described herein for use in conjunction with the embodiments of the leak detection device (sensor), the invention is not limited thereto. Other indicator devices, e.g., communication devices, can be incorporated as components of a leak detection system, to provide preselected and desired indicator responses. For example, a wireless communication device (e.g., a cellular phone) may be selected as the indicator device of choice, with a phone or text message selected as the indicator response. Leak detection locations are also not limited. For example, fluid leaks resulting from seal failures in pumps and pumping systems of analytical instruments or instrument systems can also be monitored in conjunction with the leak detection device of the invention. In yet other applications, the device (sensor) may be configured for uses other than leak detection, e.g., to detect fluid fill levels in fluid containers. Thus, no limitations are intended by the description to the simple instrument designs and leak detection locations described herein. All configurations as will be implemented by those of skill in the art in view of the disclosure are within the scope of the invention.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the spirit and scope of the invention.

We claim:

1. A leak detection device for detection of a fluid leak in a liquid chromatography or liquid adsorption chromatography instrument or system, comprising:
   a cellulose-based collection tube that includes a felt-, cloth-, sponge-, or polymer-based fluid absorbing material positioned at a fluid receiving end thereof in electrical communication with a first and a second lead of an indicator device, said indicator device provides a preselected response when liquid collected by said fluid absorbing material from said fluid leak establishes a liquid circuit between said first lead and said second lead.

2. The device of claim 1, wherein said polymer-based fluid absorbing material is selected from the group consisting of polyesters, polypropylenes, nylons, fluoropolymers, and combinations thereof.

3. The device of claim 1, wherein said indicator device connects to a wireless transmission device.

4. The device of claim 1, wherein said collection tube is filled with a porous frit material.

5. A method for detecting a fluid leak in a liquid chromatography or liquid adsorption chromatography instrument or system, comprising the steps of:
   placing a cellulose-based collection tube that includes a felt-, cloth-, sponge-, or polymer-based fluid absorbing material at a fluid receiving end thereof in electrical communication with a first and a second lead of an indicator device positioned within a fluid flow path of said instrument or system;

absorbing liquid released from said fluid leak into said liquid absorbing material establishing a liquid circuit between said first lead and said second lead; and delivering said preselected response with said indicator device to indicate presence of said fluid leak in said analytical instrument or instrument system.

6. The method of claim 5, wherein the delivering step includes delivering a preselected response selected from the group consisting of: alarming, displaying, transmitting, lighting, and combinations thereof.

* * * * *

UNITED STATES PATENT AND TRADEMARK OFFICE
CERTIFICATE OF CORRECTION

| | |
|---|---|
| PATENT NO. | : 7,752,890 B2 |
| APPLICATION NO. | : 11/936989 |
| DATED | : July 13, 2010 |
| INVENTOR(S) | : Karl K. Weitz and Ronald J. Moore |

It is certified that error appears in the above-identified patent and that said Letters Patent is hereby corrected as shown below:

Col. 2, line 49: "failing" should be replaced with "falling"

Signed and Sealed this
Eighth Day of March, 2011

David J. Kappos
*Director of the United States Patent and Trademark Office*